United States Patent [19]

Bunnell

[11] Patent Number: 5,394,948
[45] Date of Patent: Mar. 7, 1995

[54] HITCH ASSEMBLY FOR A TRACTOR

[75] Inventor: Michael C. Bunnell, Clarendon Hills, Ill.

[73] Assignee: Case Corporation, Racine, Wis.

[21] Appl. No.: 18,699

[22] Filed: Feb. 17, 1993

[51] Int. Cl.6 .......................... B60D 1/04; B60D 1/28
[52] U.S. Cl. ................................... 172/677; 280/506;
                                           280/507; 280/515; 280/406.1
[58] Field of Search ............... 172/677; 56/14.9, 15.1,
                 56/15.6; 280/504, 506, 507, 515, 405.1, 406.1

[56] References Cited

U.S. PATENT DOCUMENTS

| | | | |
|---|---|---|---|
| 2,448,744 | 9/1948 | Strader | 280/506 |
| 2,592,841 | 4/1952 | Acton | 56/15.1 X |
| 2,900,931 | 8/1959 | Lisle | 172/677 X |
| 3,021,658 | 2/1962 | Mitchell | 56/15.1 |
| 3,073,622 | 1/1963 | Merritt | 280/405 |
| 3,169,784 | 2/1965 | Lorimor | 280/507 |
| 3,470,965 | 10/1969 | Quickstad | 172/311 |
| 3,481,408 | 12/1969 | Twidale | 172/311 |
| 3,865,407 | 2/1975 | Klassen | 280/504 X |
| 4,047,575 | 9/1977 | Wagner | 172/311 |
| 4,172,537 | 10/1979 | Gandrud et al. | 222/135 |
| 4,318,444 | 3/1982 | Hake | 172/456 |
| 4,366,867 | 1/1983 | Filbrun | 172/776 |
| 4,398,322 | 8/1983 | Ewen | 280/504 X |
| 4,479,554 | 10/1984 | Kueker | 172/311 |
| 4,579,364 | 4/1986 | Kranz | 280/507 |
| 4,664,202 | 5/1987 | Applequist et al. | 172/311 |
| 4,773,805 | 9/1988 | Krahling | 280/507 X |
| 4,821,809 | 4/1989 | Summach et al. | 172/179 |
| 4,838,015 | 6/1989 | Mouret et al. | 56/14.9 X |
| 5,290,057 | 3/1994 | Pellerito | 280/507 |

FOREIGN PATENT DOCUMENTS

| | | | |
|---|---|---|---|
| 0231551 | 8/1987 | European Pat. Off. | 280/507 |
| 0289340 | 11/1988 | European Pat. Off. | 280/507 |
| 944700 | 6/1956 | Germany | 280/507 |
| 2255538 | 11/1992 | United Kingdom | 280/507 |
| 1255456 | 9/1986 | U.S.S.R. | 280/507 |
| 1568935 | 6/1990 | U.S.S.R. | 56/14.9 |

Primary Examiner—2
Assistant Examiner—Christopher J. Novosad
Attorney, Agent, or Firm—Rudnick & Wolfe

[57] ABSTRACT

A hitch assembly for releasably coupling an agricultural implement to a tractor frame. The hitch assembly includes a cantilevered drawbar rearwardly extending from the tractor frame. A free end of the drawbar is suited for connection to a tongue of the implement. A force transfer assembly interconnects the free end of the drawbar to the tractor frame and includes an elongated rigid link for transferring forces imparted to the drawbar by the implement to the tractor frame thereby enhancing support for the drawbar.

10 Claims, 2 Drawing Sheets

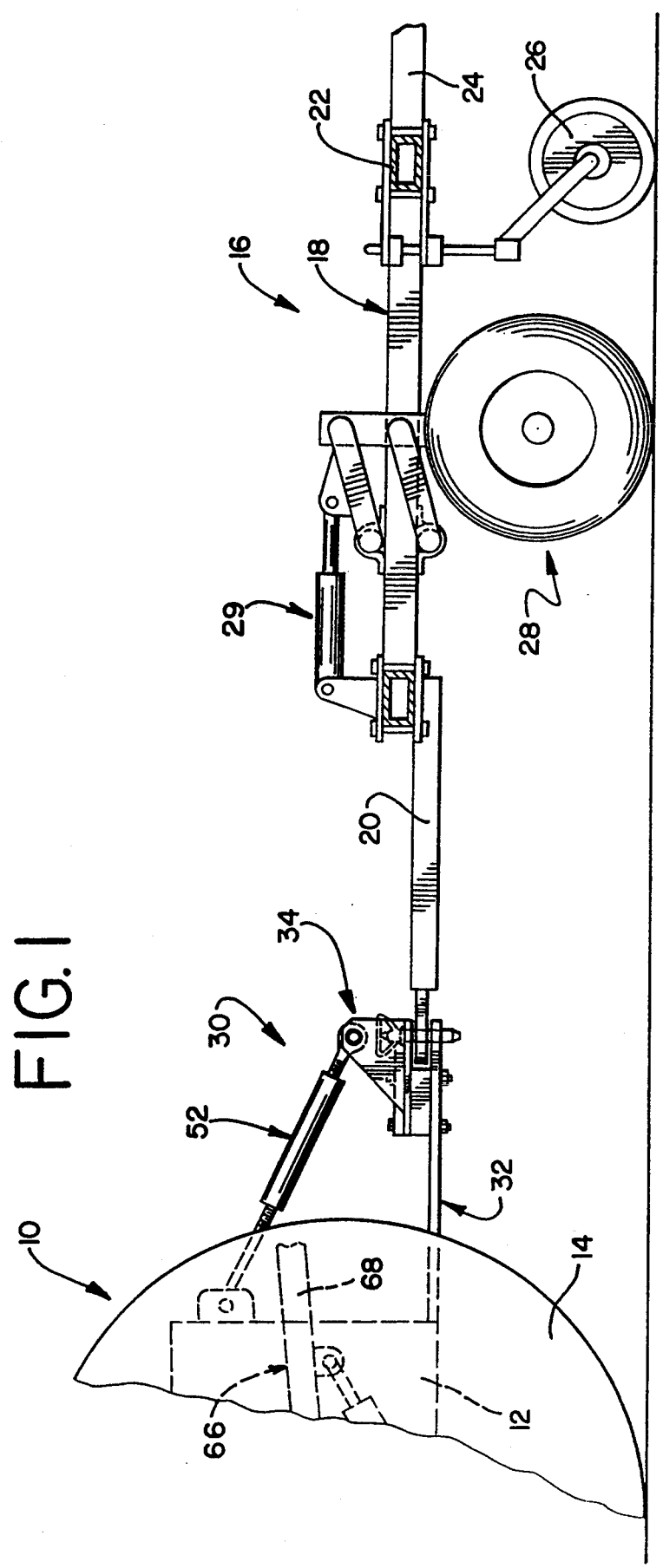

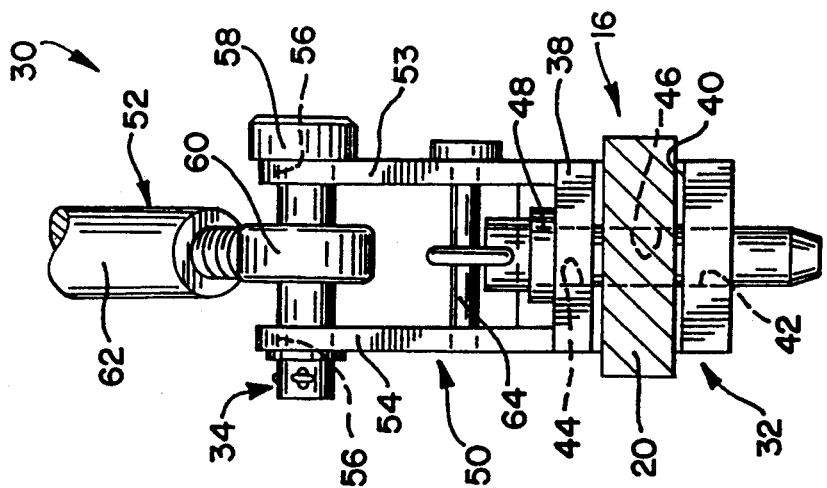
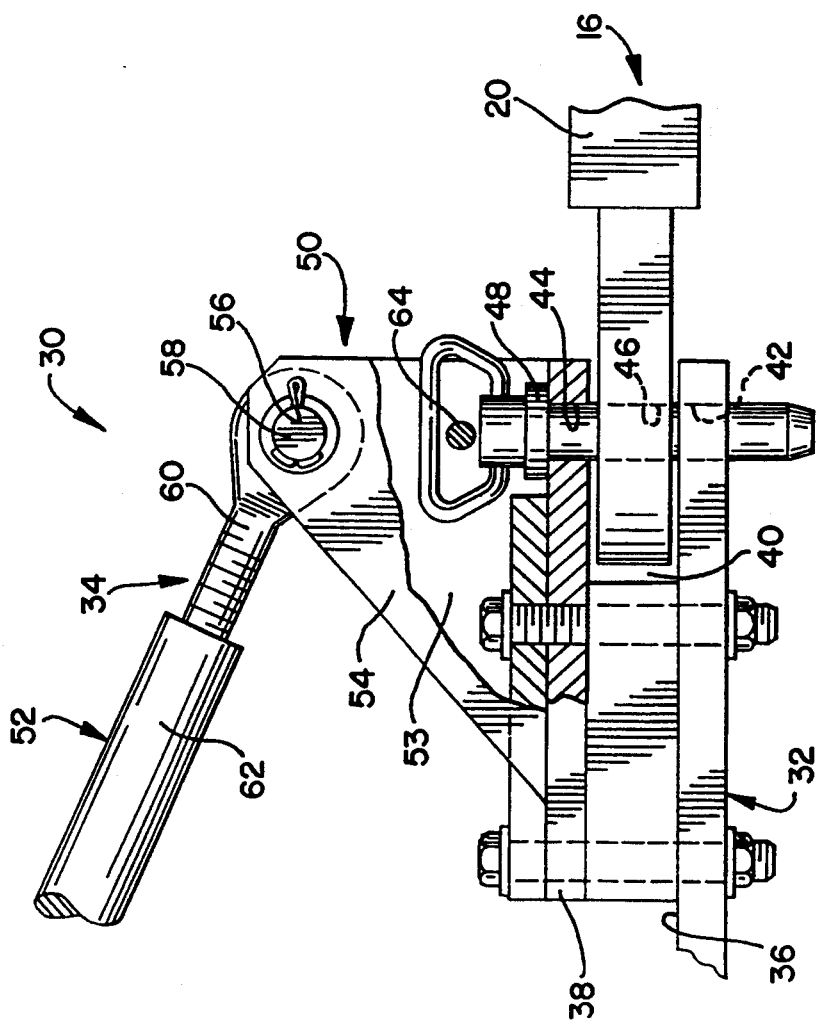

HITCH ASSEMBLY FOR A TRACTOR

FIELD OF THE INVENTION

The present invention generally relates to agricultural equipment such as farm tractors and, more particularly, to a drawbar hitch assembly which couples a farm implement in draft relation to the tractor.

BACKGROUND OF THE INVENTION

It is common practice to provide a tractor with a drawbar which connects an implement in draft relation to the tractor. Over the years, a trend has developed toward large folding type implements. Front folding implement configurations appear to be a particularly popular design.

Front folding implements typically include a main or center section with a horizontally elongated central yoke or tongue which connects the implement to the drawbar of the tractor. Left and right wing sections are pivotally connected to the center section. The wing sections are spread to the side of the center section when the implement is used in the field. The wing sections fold forwardly and the free ends of the wing sections are supported by the tongue to facilitate transportation of the implement.

Each section of the implement includes a wheeled frame which can have different configurations. An implement frame typically includes rearwardly extending frame members and a series of horizontally elongated tool bars rigidly connected to and extending laterally between the frame members. Depending upon the particular implement design, a plurality of laterally spaced row units or ground engaging elements or tools are mounted to each tool bar.

Vertically displacable wheel assemblies arranged forwardly of the tool bars regulate the elevation of the implement frame relative to the ground. Arranging the wheel assemblies forward of the tool bars is becoming a much more common practice. This is due to the need and desire to laterally adjust the row units or ground engaging elements along the length of each tool bar so as to provide the farmer with versatility regarding adjusting row spacings on seeding and cultivating implements.

While facilitating farming techniques, the increased size of today's implement has created problems in that relatively large vertical loads are applied to the tractor drawbar. It is not uncommon for such loads to exceed manufacturer's requirements for the tractor drawbar.

One approach at solving the drawbar loading problem involves using support chains which depend from the tractor and are tensioned in response to a downward or positive load being applied to the drawbar. Alternatively, specially designed drawbars have been fitted to the lift links of a conventional three-point tractor hitch mechanism. As will be appreciated, specially designed drawbars require several extra components and, thus, add considerable expense to the manufacturer and to the former.

It is important to note that these heretofore known devices offer support only in a downward or positive loading mode. Implements having the wheel assemblies arranged forwardly of the tool bars, however, are capable of imparting both a negative or upwardly directed load and the positive downwardly directed load to the drawbar depending upon the mode of implement operation. Although the tension bearing ability of the support chains allows them to offer drawbar support against positive or downward loads, these support chains neither can nor do offer support against negative or upwardly directed drawbar loads. Similarly, heretofore known specially designed drawbars do not offer support against negative or upward loads applied against the drawbars. This is because the hydraulic motors used to position the lift links which carry the specially designed drawbar are typically designed to offer little or no resistance to upward movement of the lift links. Accordingly, none of the heretofore known devices are capable of offering drawbar support to counter both positive and negative loads imparted to the tractor drawbar.

Thus, there is a need and a desire for an economical drawbar hitch assembly which couples a farm implement in draft relation to the tractor and which provides drawbar support to counter both positive and negative loads.

SUMMARY OF THE INVENTION

In view of the above, and in accordance with the present invention, there is provided a hitch assembly for releasably coupling an agricultural implement to a tractor frame. The hitch assembly includes a drawbar which horizontally extends rearwardly from the tractor frame. A free end of the drawbar is suited for connection to a tongue of the implement. A force transfer assembly interconnects the free end of the drawbar to the tractor frame. The force transfer assembly includes an elongated rigid link for transferring both positive and negative loads or forces imparted to the drawbar by the implement to the tractor frame thereby enhancing support for the drawbar.

In a preferred form of the invention, the force transfer assembly further includes a coupling affixed toward the free end of the tractor drawbar. The coupling preferably includes a pin which articulately connects one end of the rigid link to the drawbar.

In a preferred form of the invention, the coupling is configured with a latch pin. The latch pin passes over a vertical fastener which articulately connects the implement tongue to the free end of the drawbar thereby inhibiting inadvertent vertical displacement of the fastener during implement operation.

The rigid link of the force transfer assembly is preferably arranged in vertical alignment with the tractor drawbar. The rigid link is articulately connected to the tractor and depends at an acute angle therefrom. In a most preferred form of the invention, the rigid link is comprised of a plurality of parts which are interconnected in a turnbuckle design to permit adjustment of the effective length of the elongated link.

A unique advantage of the force transfer assembly of the present invention is its ability to transfer both positive and negative drawbar loads to the tractor frame thereby enhancing support for the drawbar. Adjustably configuring the rigid link allows all slack between the drawbar and the frame to be removed thus positively transferring the loads to the tractor frame. In a preferred form of the invention, the rigid link of the force transfer assembly is one part of a conventional three-part hitch mechanism. Since most large tractors come equipped with a three-point hitch mechanism, the present invention is both economical and efficient. Configuring the coupling of the force transfer mechanism with a latch pin which extends directly above the implement fastener furthermore prevents the fastener from coming dislodged during implement operation.

Numerous other features and advantages of the present invention will become readily apparent from the following detailed description, the accompanying drawings, and the appended claims.

BRIEF DESCRIPTION OF THE DRAWINGS

FIG. 1 is a fragmentary side elevational view of a tractor embodying a hitch assembly according to the present invention;

FIG. 2 is an enlarged fragmentary side elevational view with portions broken away for purposes of clarity; and FIG. 3 is a rear elevational view of that portion of the hitch assembly illustrated in FIG. 2.

DESCRIPTION OF THE PRESENT INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, there is schematically shown a tractor which is depicted only fragmentarily and is seen as represented in its entirety in FIG. 1 by reference numeral 10. Tractor 10 includes a fore-and-aft extending chassis or frame 12 supported for movement across the field by front and rear pairs of wheels 14, with only one wheel being illustrated for purposes of this description.

An agricultural or farm implement 16 is connected in draft relation to a rear end of the tractor 10. Implement 16 can take many forms depending upon the particular operation to be performed. Suffice it to say, implement 16 includes a wheeled frame assembly 18 comprised of a central section with wing sections which are hinged to the center section for transport to reduce the overall width of the implement 16. A rigid, elongated tongue 20 extends forwardly from the frame assembly 18.

In the illustrated embodiment, each implement section includes a series of laterally elongated tool bars 22 which are joined to fore-and-aft extending frame members 24. A plurality of ground engaging elements 26 are typically connected to the tool bars 22 in a conventional manner allowing for lateral adjustment of the elements 26 along the length of the respective tool bar 22.

Each frame section is further provided with a wheel assembly 28. As is known, each wheel assembly 28 is vertically displacable under the influence of a driver 29 to regulate the elevation of the frame assembly 18 and the elements 26 carried thereby. As shown, and to promote lateral adjustment of the elements 26 along the length of the tool bars 24, the wheel assembly 28 is arranged forwardly of the tool bars 24.

A hitch assembly 30 detachably couples the farm implement 16 to the tractor 10. The hitch assembly 30 includes a drawbar 32 and a force transfer assembly 34. The drawbar 32 is attached at a first end to and extends in a cantilevered fashion rearwardly from the chassis or frame 12 of the tractor. The drawbar 32 terminates at a second end disposed away from the frame 12 of the tractor. As shown in FIG. 2, the second end of the drawbar 32 is configured to releasably connect the tongue 20 of the implement 16 in overlying relation to an upper surface 36 of the drawbar 32.

As shown in FIGS. 2 and 3, the hitch assembly 30 further includes a hammer strap 38 which is connected to the upper surface 36 of the drawbar 32. The hammer strap 38 is connected in vertically spaced relation to the drawbar 32 to define an opening 40 which captively accommodates the free-end of the implement tongue 20.

In the illustrated embodiment, the drawbar 32 and hammer strap 38 define vertically aligned apertures 42 and 44, respectively. Similarly, the free-end of the implement tongue 20 defines an aperture or opening 46. A fastener or pin 48 is adapted to vertically pass endwise through the apertures 42, 44 and 46 to articulately connect the implement tongue 20 to the free-end of the drawbar 32.

To enhance the load-carrying capacity of the drawbar, the force transfer assembly 34 interconnects the free-end of the drawbar 32 to the frame 12 of the tractor 10. In the illustrated embodiment, the force transfer assembly 34 includes a coupling 50 and a rigid link 52. In the illustrated embodiment, coupling 50 includes a pair laterally spaced upstanding arms 53 and 54 which are rigidly connected toward the free-end of the drawbar 32. An upper end of each arm 53, 54 defines aligned apertures 56 which releasably accommodate a pin-type connector 58.

The rigid link 52 of the force transfer assembly 34 is releasably connected at a first end to the coupling 50 preferably by the pin type connector 58. An opposite end of link 52 is articulately connected to the tractor frame 12 at a location vertically spaced from the drawbar 32. The rigid link 52 depends from the tractor frame 12 at an acute angle to and is arranged in general vertical alignment with the drawbar 32 to provide load support in opposite vertical directions to the drawbar 32.

In a most preferred form of the invention, the rigid link 52 is comprised of at least two members 60 and 62 which are adjustably fixed relative to each other. Preferably, members 60, 62 of link 52 are interconnected in a turnbuckle designed to permit adjustment of the effective length of link 52. As shown in FIG. 1, link 52 of the force transfer assembly 34 preferably comprises one piece of a three-piece tractor hitch mechanism 66 including a pair of hydraulically actuated lift arms 68 disposed on opposite sides of link 52.

In the embodiment illustrated in FIGS. 2 and 3, coupling 50 further includes a releasable latch pin 64. Latch pin 64 passes endwise through the upstanding arms 53, 54 of coupling 50 and above the fastener 48 to inhibit inadvertent vertical displacement of the fastener 48 as the implement is towed across the field.

When the wing sections of the implement are forwardly folded for transport, they are typically supported by the tongue 20 of the implement frame assembly. Thus, there is a significant downward or positive loading placed upon the free-end of the drawbar 32. When the wing sections are unfolded, and the wheel assembly 28 elevates the elements 26 above the ground, the ground contact of the wheel assembly establishes a fulcrum, and the implement weight rearwardly of the wheel assembly 28 often causes the tongue 20 of the implement to rise thereby imparting a negative loading to the drawbar 32. The loading of the drawbar oftentimes exceeds the manufacturer's suggested recommendations.

The force transfer assembly 34 of the hitch assembly of the present invention transfer the loads imparted to the drawbar 32 to the frame 12 of the tractor thereby enhancing drawbar support. The ability to adjust the effective length of the rigid link 52 allows all end play to be removed and, thus, provides load support for the drawbar in both vertical directions.

As will be appreciated, the configuration of the force transfer assembly 34 and attachment to the upper surface 36 of the drawbar 32 allows elimination of the hammer strap 38 if so desired.

The coupling 50 which allows the rigid link 52 to be connected to the free-end of the drawbar 32 further promotes effective operation of the implement through use of the releasable latch pin 64. As will be appreciated, passing the latch pin 64 above and across the fastener 48 inhibits vertical displacement of the fastener 48 and thereby maintains the articulate connection between tractor 10 and implement 16.

The force transfer assembly 34 of the hitch assembly is effective in operation and economical in that almost no extra parts are required over a basic tractor. That is the rigid link 52 of the force transfer assembly 34 can form part of a three-point hitch mechanism 66 which is typically included with most larger type tractors.

Numerous other features and advantages of the present invention will become readily apparent from the following detailed description, the accompanying drawings, and the appended claims.

What is claimed is:

1. A hitch assembly for coupling an agricultural implement to a tractor having a chassis supported for movement over a field, said implement including a wheeled frame including an apertured tongue, said hitch assembly comprising:
   a cantilevered drawbar extending from the chassis, with a free end of the drawbar defining a vertical aperture;
   a coupling affixed to an upper surface of and toward the free end of said drawbar to define an opening therebetween for accommodating a free end of the tongue of said implement frame, said coupling defining a vertical aperture that is vertically aligned with the vertical aperture in said drawbar;
   a vertically slidable fastener that is insertable under the influence of an operator through the aligned apertures in said coupling and drawbar and through the aperture in said tongue to articulately connect the tongue of the implement frame to the free end of the draw bar; and
   an elongated rigid link releasably connected at one end by a pin connector to the coupling and at an opposite end to the chassis at a location in line with and above the drawbar to provide load support in opposite vertical directions to said drawbar.

2. The hitch assembly according to claim 1 wherein said coupling further includes a releasable pin which passes over the fastener to prevent inadvertent vertical displacement of the fastener.

3. The hitch assembly according to claim 1 wherein said elongated link includes at least two members which are adjustably fixed to each other to alter the effective length of the link.

4. A hitch assembly for releasably coupling a towed agricultural implement to a tractor having a chassis supported for movement across a field, said implement including a frame including an apertured and free ended tongue, said hitch assembly comprising:
   a generally horizontal drawbar extending rearwardly from the chassis; and
   a force transfer assembly interconnecting the free end of the drawbar to the chassis, said transfer assembly including a coupling affixed to an upper surface of and toward the free end of the drawbar to define an opening therebetween for vertically entrapping the free end of the tongue of the implement frame, an elongated rigid link extending between the chassis and articulately connected to the coupling for transferring forces imparted to the drawbar in either vertical direction by the implement to the chassis thereby enhancing support for the drawbar, and a vertical fastener that slidably passes completely through said coupling and the apertured free ends of said tongue and drawbar to articulately interconnect the implement from the chassis.

5. The hitch assembly according to claim 4 wherein the coupling of said force transfer assembly includes a pair of laterally spaced arms attached to and upstanding from an upper surface of said drawbar and to which one end of said elongated link is articulately connected by a pin that passes between said arms.

6. The hitch assembly according to claim 5 wherein said coupling further includes a pin which passes transversely between said upstanding arms and over said fastener to inhibit inadvertent vertical displacement of said fastener as said implement is towed across said field.

7. The hitch assembly according to claim 4 wherein said link is comprised of at least two members which are adjustable relative to each other to thereby modify the effective length of said link.

8. A hitch assembly for releasably coupling a farm implement in draft relation to a tractor having a fore-and-aft extending chassis, said implement including a wheeled frame including a central fore-and-aft extending apertured tongue, said hitch assembly comprising:
   a drawbar attached at a first end to and extending in a fore-and-aft direction from the chassis of the tractor, said drawbar terminating at a second free end disposed away from the chassis and configured with a vertical opening;
   a force transfer assembly for interconnecting the second end of said drawbar and the tractor chassis, said transfer assembly including a coupling affixed to an upper surface of and toward the second end of the drawbar to vertically entrap the apertured tongue of the implement between an upper surface of the drawbar and a lower surface of the coupling, an elongated and rigid link arranged in general vertical alignment with said drawbar, with a first end of said link being connected to said tractor chassis in vertically spaced relation from the drawbar and having a second end articulately connected to the coupling to transfer forces imparted to said drawbar in either vertical direction from the implement frame to the tractor chassis, and a vertical fastener that slidably passes completely through vertically aligned apertures in said coupling and said drawbar and through the aperture in said tongue entrapped between the coupling and the drawbar to articulately interconnect the implement frame to the chassis.

9. The hitch assembly according to claim 8 wherein the elongated link of said transfer assembly comprises one piece of a three piece tractor hitch mechanism.

10. The hitch assembly according to claim 8 wherein said elongated link includes at least two members interconnected in a turnbuckle design to permit adjustment of the effective length of said link.

* * * * *